United States Patent [19]

Hurley et al.

[11] Patent Number: 4,576,719

[45] Date of Patent: Mar. 18, 1986

[54] PROCESS FOR THICKENING DIGESTED SLUDGE

[75] Inventors: Brian J. E. Hurley, Wickford; Anthony J. Rachwal, West Molesey, both of England

[73] Assignee: Thames Water Authority, London, England

[21] Appl. No.: 584,454

[22] Filed: Feb. 28, 1984

[30] Foreign Application Priority Data

Feb. 28, 1983 [GB] United Kingdom ................. 8305446

[51] Int. Cl.⁴ ............................................ C02F 11/06
[52] U.S. Cl. .................................... 210/620; 210/609; 210/613
[58] Field of Search ............... 210/605, 609, 613, 614, 210/620, 629–631

[56] References Cited

U.S. PATENT DOCUMENTS 2,875,151 2/1959 Davidson ........................... 210/605
3,649,531 3/1972 Brown et al. ....................... 210/605

FOREIGN PATENT DOCUMENTS 1464554 2/1977 United Kingdom .
2093727 9/1982 United Kingdom .

Primary Examiner—Thomas Wyse
Attorney, Agent, or Firm—Parkhurst & Oliff

[57] ABSTRACT

The invention relates to a process for thickening digested sludge, comprising the steps of providing digested sludge to be thickened, and then passing a gas, preferably air, through the digested sludge at an intensity in the range of above 0.1 to 5 gas to 1 sludge, on a volume basis, per hour. Sludge can be thickened to greater than 5% solids in ten days, an improvement of nearly 10 times that of traditional practice, as shown respectively by plots B and A.

7 Claims, 8 Drawing Figures

PROCESS FOR THICKENING DIGESTED SLUDGE

TECHNICAL FIELD OF INVENTION

The invention relates to a process for thickening digested sludge, and to a digested sludge thickened by the process.

BACKGROUND ART

Digested sludge is known to consolidate less readily than most primary sludges. The latter will usually consolidate in conventional primary sedimentation tanks to provide a sludge containing between 4 and 6% dry solids. This degree of consolidation is achieved with considerably less than one day's settlement. Anaerobic digestion of such a primary sludge results in up to 50 percent of the organic matter being rendered soluble or released as sludge gas. A typical digested sludge contains only 2.5% dry solids after 20 days in a primary digester.

Frequently, the primary digester is coupled in series with a secondary 'digestion' or thickening tank where the sludge may be held for a further 10 to 60 days. Traditionally, this secondary digester is similar to the primary digester though it is neither heated nor mixed as is the primary digester. In the secondary digester, gravity concentration of digested sludge solids and decanting of supernatant liquor takes places. This reduces the volume of the sludge requiring further processing and disposal. Very little solids reduction and gas production takes place in the secondary digester.

Unfortunately, many secondary digesters have performed poorly as thickeners, producing dilute sludge and a high strength supernatant liquor. The basic cause of the problem is that, in most cases, anaerobically digested sludges do not settle readily. Two major factors contribute to this phenomenon:

(1) Continued gas evolution: During the digestion process considerable quantities of sludge gas, typically containing 70% methane and 30% carbon dioxide, are produced. When fresh digested sludge is pumped into large thickening tanks the sludge is still warm and can continue the digestion process, producing sludge gas for many weeks. This results in rising gas bubble disturbance of the sludge, preventing any significant consolidation until gas production ceases.

(2) Microbubble hold up: The contents of the primary digestion tank become supersaturated with methane and carbon dioxide gas. When this sludge is transferred into the secondary digestion tank, the gas comes out of solution, forming small bubbles. These microbubbles attach to sludge particles and provide a bouyant force that hinders settling until the bubbles coalesce and rise to the sludge surface.

(3) The effect of continued gas evolution particularly in large volume, deep secondary thickeners is to prevent any separation of supernatant liquor and sludge for periods of up to 30 days. Even after gassing ceases, settlement is still extremely slow, in deep (10 m), secondary thickeners, moving to the pronounced microbubble hold up effect.

The problem of this lack of consolidation, or thickening, of this digested sludge will be apparent when its handling, and volume is considered.

The quantity of sewage sludge disposed of annually in the United Kingdom amounts to about 35 million wet tonnes of which about 50% is digested. The problem of consolidating the 18 million $m^3$ of liquid sludge produced by anaerobic digestion prior to ultimate disposal to land or sea is thus of great importance.

Consolidation or thickening of all digested sludge to at least 5% solids, could reduce the UK annual sludge disposal volume by 5 to 9 million $m^3$. Liquid sludge disposal transport costs were at least £1 to £2 per $m^3$ in 1982 for typical sea and land disposal operations. Annual transport savings of several million could therefore be made if the 5% solids target could be reliably attained at all UK sludge sites.

DISCLOSURE OF INVENTION

It is an object of the invention to seek to achieve a relatively simple thickening of digested sludge.

According to one aspect of the invention there is provided a process for thickening digested sludge, comprising the steps of providing digested sludge to be thickened, and then passing a gas through the digested sludge at an intensity in the range of above 0.1 to 5 gas to 1 sludge, on a volume basis, per hour.

Using the invention it is possible to thicken a digested sludge under gravity to a 5% to 6% solids content prior to further dewatering processes or ultimate disposal. The gas removes gases in the sludge which are preventing or hindering the tendency to thicken under gravity.

The gas used in the process may be air. This provides a relatively inexpensive agent for agitating the digested sludge prior to gravity thickening thereof.

The aeration intensity may be in the range 0.5 to 5 $Nm^3$ air/$m^3$ sludge per hour. Such an intensity provides a relatively cost effective and controllable process.

The aeration intensity may be 1 volume air to 1 volume sludge per hour, preferably for a period of about ten hours. Such an intensity of aeration in the step of passing the gas into the digested sludge provides an effective process.

The process may include the step of ceasing passage of gas through the digested sludge and monitoring the pH of the digested sludge during thickening after passage of the gas to control the process. The step of monitoring the pH provides a relatively simple way of controlling the process.

The step of passing the gas through the digested sludge may be carried out using a venturi device. Such a device is relatively simple in construction, can readily be installed in or lowered into a thickening tank, and provides thorough agitation of the digested sludge. Alternatively the gas can be passed into the sludge using existing pipework of the tank or coarse bubble or simple pipe aerators.

According to a second aspect of the invention there is provided a digested sludge whenever thickened using a process as hereinbefore defined.

A process according to the invention is herein defined, by way of example, with reference to the accompanying drawings.

Figure 1:
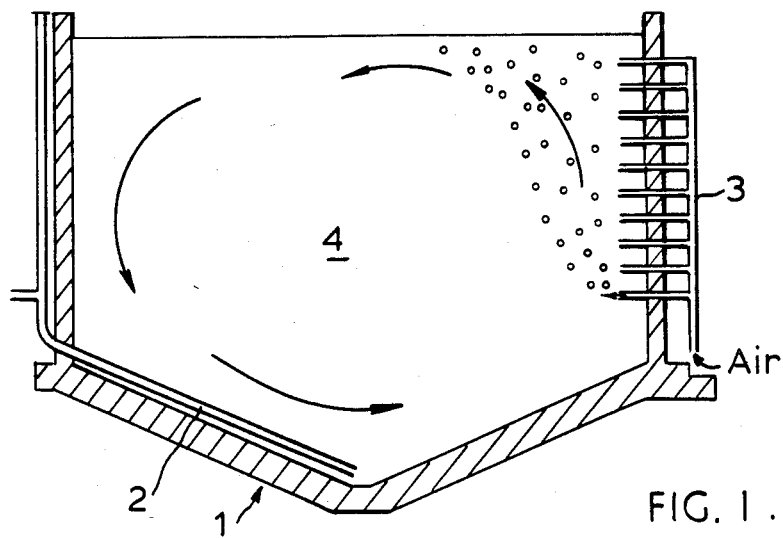
FIGS. 1 and 2 are schematic side elevational views of two thickening tanks showing various means of pre-aeration of digested sludge therein prior to gravity thickening.
Figure 2:
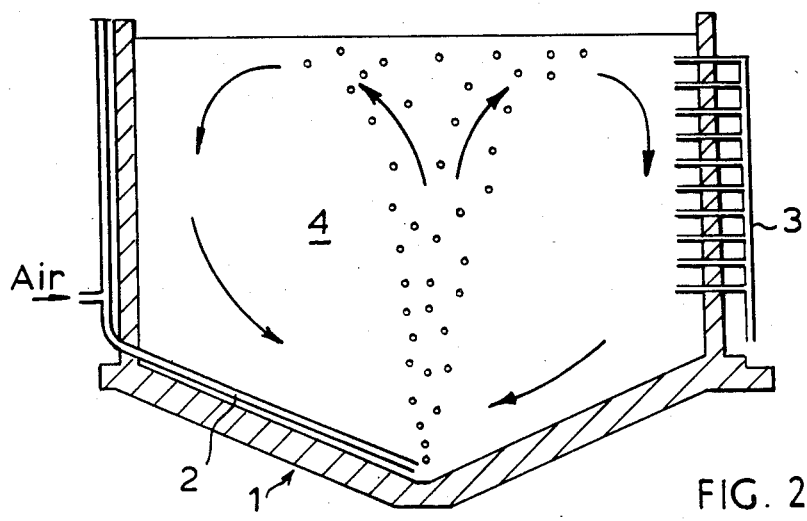

Referring to the drawings, in which like parts are referred to by like numerals, a secondary digester or thickening tank 1 which is circular in plan has an inclined bottom, a side wall and an open top (FIGS. 1 and 2). There is a feed pipe 2 for digested sludge which lies permanently along the bottom which is conical. A series of inlet pipes 3 for gas extend through the side wall. The digested sludge passes into the tank 1 from the pipe 2. It is then aerated by passage of air into the whole volume of the sludge 4 from the pipes 3 (FIG. 1).

The arrangement in FIG. 2 is similar to that shown in FIG. 1, except that the aeration gas is passed into the sludge 4 through the pipe 2 through which the sludge had originally been passed into the tank 1. In an alternative embodiment (not shown) the aeration air is passed into the digested sludge from a submerged venturi aerator (not shown) fitted with an integral centrifugal sludge pump, which venturi aerator is situated at or adjacent the bottom of the tank. In another embodiment, also not shown, the aeration air is passed into the digested sludge from a coarse bubble aerator such as a grid situated at or adjacent the bottom of the tank 1. The grid was of 25 mm diameter perforated flexible tubing. Or a simple pipe arrangement may be used to pass air into the tank to pre-aerate the digested sludge therein prior to settlement and to enhance that settlement. All these embodiments of pre-aeration of digested sludge have produced an enhanced settlement to at least 5% solids content, as shown by the following:

Two primary digesters, each of 2300 m³ capacity, supplied sludge daily to six open topped secondary thickeners or tanks like the tanks 1 and each of 12 m central depth and 1750 m³ capacity. The diameter of the thickeners was 15 m and they were conically floored with 8 m sidewalls fitted with 100 mm supernatant draw off pipes. Average sludge depth of these thickeners 1 was taken as 10 m. Conventional practice was to batch fill each thickener with 2.5% fresh digested sludge over a 10 day period, allow 50 days for consolidation decanting off any supernatant, and then dispose of the thickened sludge to land via road tanker. Less than 25% reduction in sludge volume was achieved by this mode of operation as shown by line A in FIG. 4. Aerating the digested sludge in the tanks by a process embodying the invention, after batch filling, enabled 50% consolidation to be achieved in 10 days as shown by line B in FIG. 4.

Figure 4:
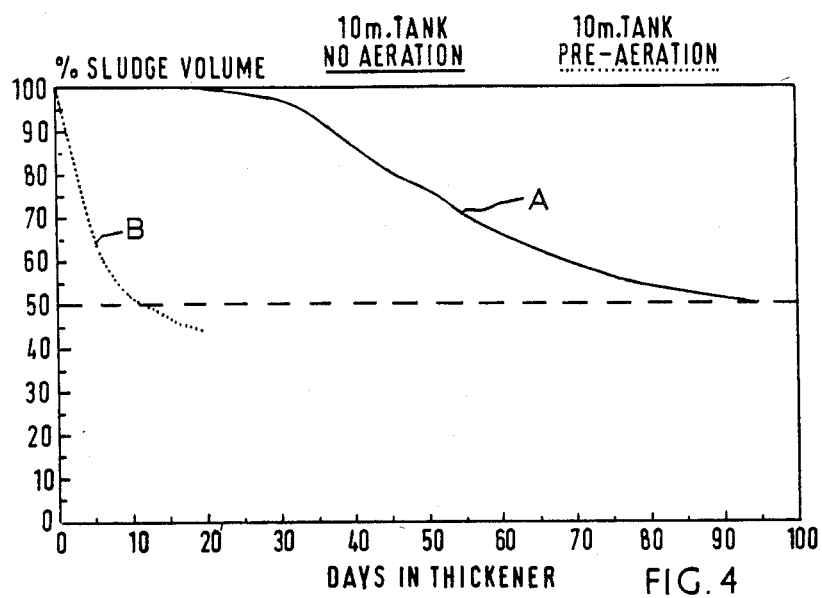
FIG. 4 is graph of digested sludge thickening according to the invention as a plot of % sludge volume against days for non-aerated and pre-aerated digested sludges.

An an initial trial, very coarse bubble aeration of the thickener 1 contents was effected by supplying also 1500 Nm³/n of air at 0.8 bar to a 100 mm supernatant decant pipe 6 m below top water level. This provided an aeration intensity of 0.9 m³ air/m³ sludge/h. Batch filling of the thickener with fresh digested sludge of 2.5% dry solids and pH 7.5 took 9 days. Mean sludge temperature was 25° C. on commencement of aeration. After 14 hours aeration sludge pH had risen to 8.1 with less than 0.5° C. change in mean temperature. Subsequent settlement produced 51% supernatant after 14 days. This trial was repeated two months later in an identical tank at an aeration rate of 1.2 Nm³ air/m³ sludge/h. The sludge pH was raised from 6.9 to 8.1 in 16 hours with again negligible change in sludge temperature. Settlement performance was almost identical, 51% supernatant being obtained 11 days after cessation of aeration. Line B in FIG. 4 is a combination of the results from these two experimental runs.

FIGS. 3A–3D show pictorially the settling process parameters.

Figure 3A:
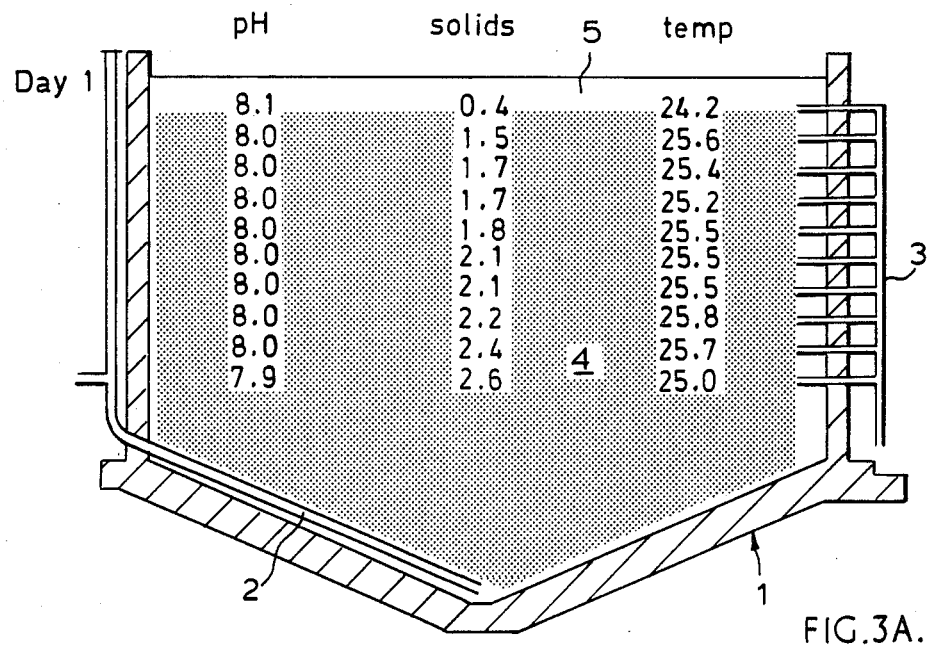
FIGS. 3A, 3B, 3C and 3D shows the effect of pre-aeration on digested sludge consolidation or thickening according to the invention in a thickening tank like those of FIGS. 1 and 2, respectively after a period of one, four, seven and fifteen days, in terms of pH, solids content and temperature.
Figure 3B:
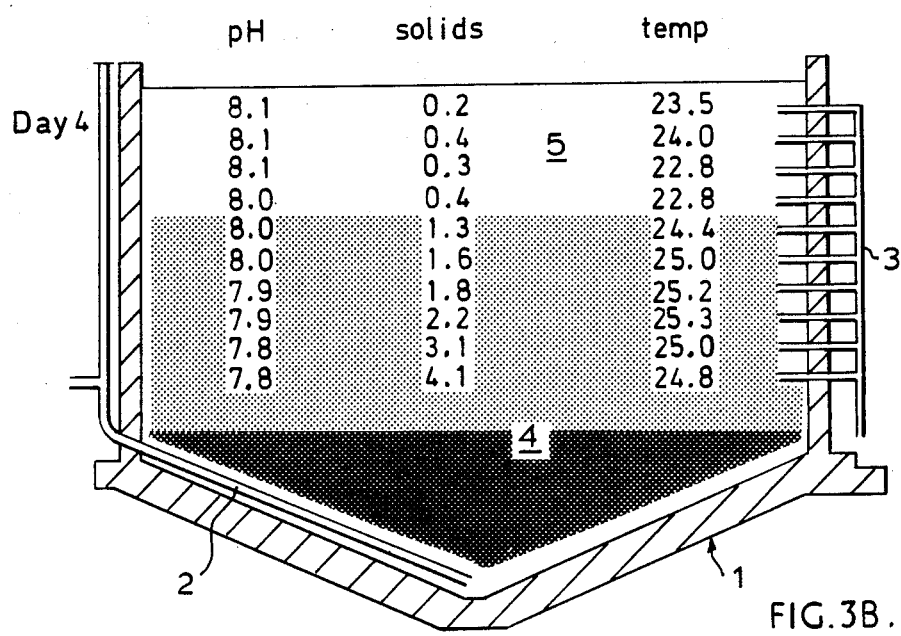
Figure 3C:
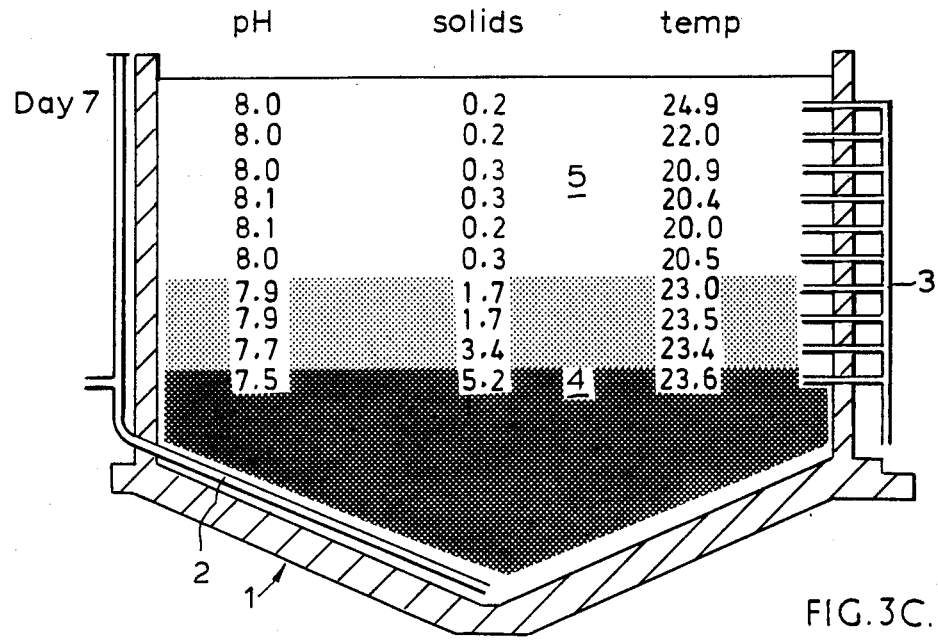

The interface between supernatant 5 and sludge 4, obtained from 1 day onwards after aeration was always well defined in terms of solids content with no evidence of stratification or floating sludge (FIG. 3A). Stability of this interface was monitored for 80 days. Supernatant quality was good, 0.3% solids, BOD 500 mg/l, $NH_3$—N 700 mg/l and pH 8.1.

Figure 3D:
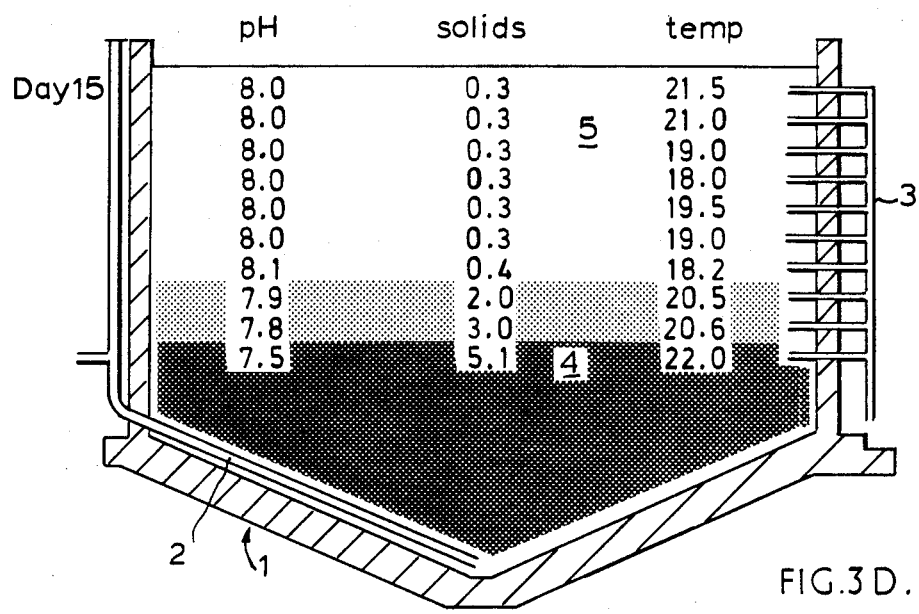
Figure 5:
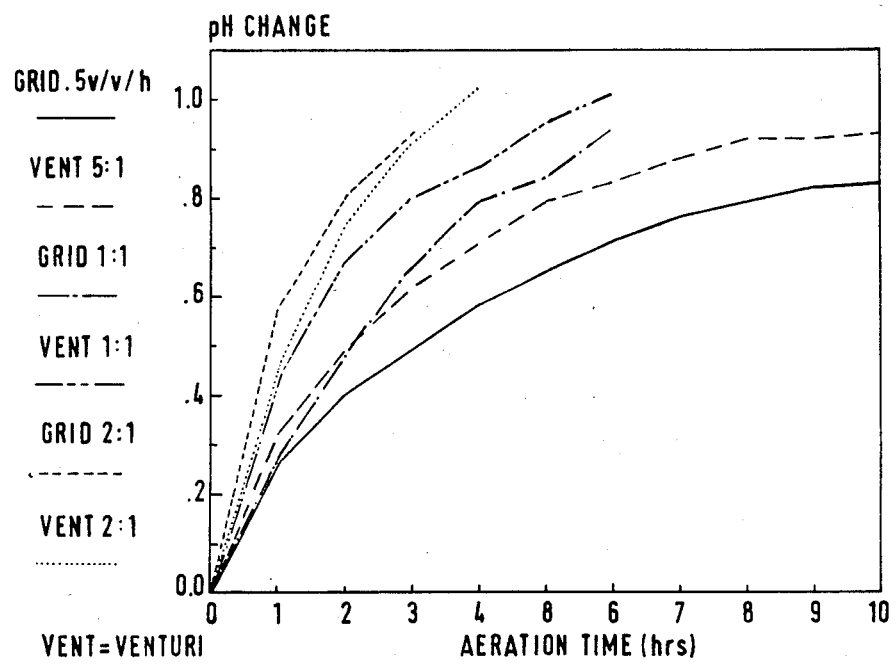
FIG. 5 is a graph of pH change against aeration time in a process according to the invention, for various aeration intensities using a grid or a venturi device for passing air through digested sludge to be thickened.

Sludge pH reduced with time falling from 8.1 to 7.5 over 15 days (FIG. 3D). This was attributed to continued activity by acid forming bacteria. Once supernatant and sludge had separated no evidence of methane product was observed even when sludge pH had returned to normal limits for digestion. FIG. 5 shows a plot of the aeration on digested sludge pH using coarse bubble grid and venturi aerators, the figures used in the graph being taken from a semi-full scale trial. The graph shows that at an aeration intensity of 2 m³ air/m³ sludge/hour there is little difference, both achieving a 1 unit of pH rise, typically from 7.2 to 8.2, in four hours. It will be understood that a pH rise to 8.1 is attributable to stripping of dissolved carbon dioxide from the digested sludge on aeration. Thus by monitoring the pH of the supernatant of the digested sludge being thickened, it is possible to control the process. The consolidated or thickened sludge at a solids content of greater than 5% can then be stripped off and fresh sludge to be treated can be passed into the thickening tank.

Using the invention it is possible to consolidate or thicken digested sludge rapidly to a solids content of greater than 5%, so that it can be subsequently treated and handled relatively easily.

It will be understood that the expression 'Nm' used herein means that the intensity is corrected to normal ambient pressure and temperature viz 1 atmosphere pressure and 20° C.

Further, it will be understood that the expression 'BOD' used herein means biochemical oxygen demand.

We claim:

1. A process for thickening digested sludge, comprising:
   (i) providing digested sludge at a pH below 8.0 to be thickened;
   (ii) providing a source of air;
   (iii) passing the air throughout the whole volume of the digested sludge at an intensity in the range of above 0.1 to 5 parts of air to 1.0 part of said sludge, on a volume basis per hour;
   (iv) periodically ceasing and restarting said air flow through said sludge;
   (v) monitoring the pH of the digested sludge during periods of ceased air flow; and
   (vi) ceasing flow of air completely and allowing settlement to thicken the sludge and provide a supernatant fraction and a sludge fraction after obtaining an indication of pH of at least about 8.0.

2. A process according to claim 1, in which the aeration intensity is in the range 0.5 to 5 Nm³ air/m³ sludge per hour.

3. A process according to claim 2, in which the aeration intensity is 1 volume air to 1 volume sludge per hour.

4. A process according to claim 3, in which an aeration intensity of 1 $Nm^3$ air per $m^3$ sludge per hour for a period of about 10 hours comprises the step of passing air into the digested sludge.

5. A process according to claim 1, in which the step of passing the gas through the digested sludge is carried out using a venturi device.

6. A process according to claim 1, in which settlement is permitted to continue for at least about 7 days.

7. A process according to claim 6, in which settlement is allowed to continue for at least about 11 days.

* * * * *